(12) United States Patent
Iwama et al.

(10) Patent No.: US 12,092,945 B2
(45) Date of Patent: Sep. 17, 2024

(54) STRUCTURE OBSERVATION DEVICE AND OBSERVATION METHOD

(71) Applicant: JFE STEEL CORPORATION, Tokyo (JP)

(72) Inventors: Takashi Iwama, Tokyo (JP); Kentaro Sato, Tokyo (JP); Shinji Sakurai, Tokyo (JP); Kayo Tokieda, Tokyo (JP); Shohei Shinozuka, Tokyo (JP); Yuhei Akiyama, Tokyo (JP); Takashi Taniguchi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/021,055

(22) PCT Filed: Jul. 19, 2021

(86) PCT No.: PCT/JP2021/026964
§ 371 (c)(1),
(2) Date: Feb. 13, 2023

(87) PCT Pub. No.: WO2022/054412
PCT Pub. Date: Mar. 17, 2022

(65) Prior Publication Data
US 2023/0296966 A1    Sep. 21, 2023

(30) Foreign Application Priority Data

Sep. 8, 2020    (JP) ................................. 2020-150537

(51) Int. Cl.
*G03B 17/55*    (2021.01)
*G03B 15/03*    (2021.01)
(Continued)

(52) U.S. Cl.
CPC ............. *G03B 17/55* (2013.01); *G03B 15/03* (2013.01); *G03B 17/02* (2013.01); *G03B 17/561* (2013.01);
(Continued)

(58) Field of Classification Search
None
See application file for complete search history.

(56) References Cited

U.S. PATENT DOCUMENTS

2012/0092549 A1\*  4/2012  Hsu .................. G03B 15/03
                                              348/374
2020/0023791 A1\*  1/2020  Kazama ............... G03B 17/55
(Continued)

FOREIGN PATENT DOCUMENTS

JP    S60-177772 A    9/1985
JP    H05-60473 A    3/1993
(Continued)

OTHER PUBLICATIONS

Oct. 12, 2021 Search Report issued in International Patent Application No. PCT/JP2021/026964.
(Continued)

*Primary Examiner* — Clayton E. LaBalle
*Assistant Examiner* — Diana Hancock
(74) *Attorney, Agent, or Firm* — Oliff PLC

(57) ABSTRACT

An object is to closely observe, by means of images of a camera having high performance specifications, changes in a structure due to heating or cooling of the structure to a temperature beyond a service temperature limit of the camera having high performance specifications and returning from that temperature to room temperature. A structure observation device includes: a camera case of a rectangular three-dimensional shape, having a glass window of heat-resistant and/or cold-resistant glass on at least one side of the
(Continued)

three-dimensional shape; heat insulating walls covering the camera case except for the glass window; a fluid supply port and a fluid discharge port through which a cooling or warming fluid is circulated into; and a camera that is disposed inside the camera case and captures a still image or a moving image through the glass window and externally outputs or internally stores data of the captured image.

7 Claims, 4 Drawing Sheets

(51) Int. Cl.
　　　*G03B 17/02*　　　(2021.01)
　　　*G03B 17/56*　　　(2021.01)
(52) U.S. Cl.
　　　CPC ............... *G03B 2215/0503* (2013.01); *G03B 2215/0575* (2013.01)

(56) References Cited

U.S. PATENT DOCUMENTS

| | | | | |
|---|---|---|---|---|
| 2020/0247330 A1* | 8/2020 | Tokunaga | .............. | G03B 17/55 |
| 2021/0160405 A1* | 5/2021 | Yano | .................... | H04N 23/51 |
| 2021/0231910 A1* | 7/2021 | Mano | .................... | G03B 17/56 |
| 2021/0250482 A1* | 8/2021 | Schieltz | ................ | H04N 23/51 |
| 2021/0271154 A1* | 9/2021 | Ding | .................... | H04N 23/52 |

FOREIGN PATENT DOCUMENTS

| | | | |
|---|---|---|---|
| JP | 2001318407 A | * | 11/2001 |
| JP | 2005084367 A | * | 3/2005 |
| JP | 4015354 B2 | | 11/2007 |
| JP | 2009-066514 A | | 4/2009 |
| JP | 4427771 B2 | | 3/2010 |
| JP | 5358331 B2 | | 12/2013 |
| JP | 2017-103583 A | | 6/2017 |
| KR | 10-1692308 B1 | | 1/2017 |
| KR | 10-2018-0114369 A | | 10/2018 |

OTHER PUBLICATIONS

Mar. 14, 2023 Office Action issued in Japanese Patent Application No. 2022-547423.

Mar. 11, 2024 Extended European Search Report issued in European Patent Application No. 21866372.2.

* cited by examiner

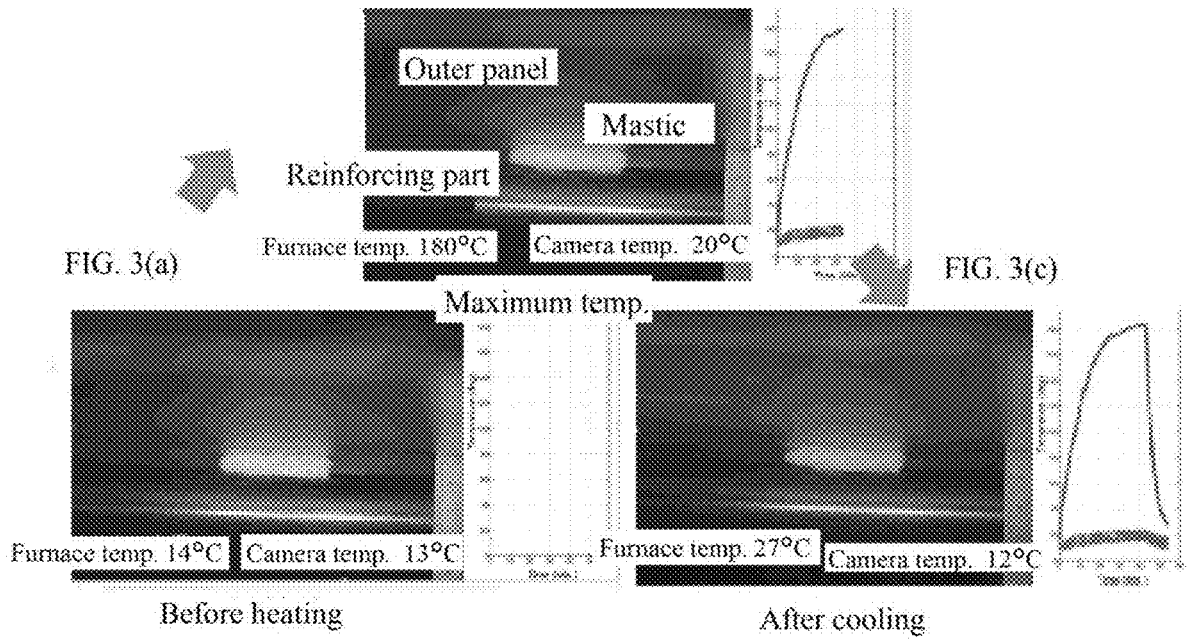
FIG. 3(a) Before heating
FIG. 3(b) Maximum temp.
FIG. 3(c) After cooling
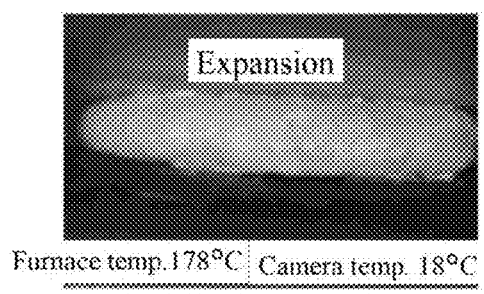
FIG. 4(a)
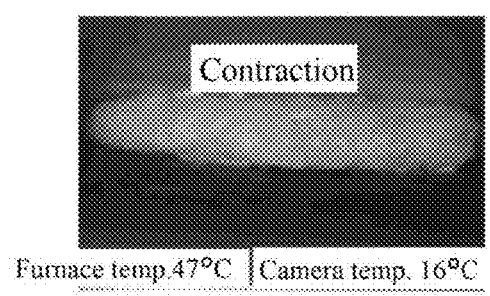
FIG. 4(b)

STRUCTURE OBSERVATION DEVICE AND OBSERVATION METHOD

TECHNICAL FIELD

The present invention relates to an observation device and an observation method for observing changes in a structure, such as an automotive body part, under high-temperature or low-temperature conditions.

BACKGROUND ART

Weight reduction of vehicle bodies has been pursued to improve automotive fuel efficiency (cut $CO_2$ emissions) as part of environmental measures. Vehicle body parts called exterior panel parts are disposed on the outer side of an automobile and include a door, roof, hood (bonnet), fender, and back door (tailgate). Reducing the weight (panel thickness) of these exterior panel parts has also been considered. Since particularly exterior panel parts are parts with large projected areas compared with other vehicle body parts, reducing the thickness of the sheet material has a great weight-reducing effect.

However, reducing the thickness of the sheet material of an exterior panel part tends to reduce the rigidity of the part, and recently there have been occurrences of defects of an outer panel constituting a part of an exterior panel part deforming due to heat during coating and baking. The temperature applied to an exterior panel part during baking is about 200° C.

Generally, in a coating and baking process, vehicle bodies being produced are conveyed inside a furnace having a high temperature of about 200° C. The cause of occurrence of thermal deformation of the outer panel is not clarified because the heat resistance of an image capturing device or a measurement instrument cannot be secured and therefore observation is impossible.

As shown in FIG. 5, an exterior panel part is typically composed of an outer panel OP and an inner panel IP joined together at their peripheral portions by welding or the like. To secure the rigidity of the outer panel OP, reinforcing parts RP are disposed between a back surface of the outer panel OP and the inner panel IP, and the inner panel IP and the reinforcing parts RP are joined together by welding or the like, while the outer panel OP and the reinforcing parts RP are bonded together with a mastic agent M.

The mastic agent M has properties of being semi-solid (having the softness of a toothpaste) before being applied and conforming to the shape of a part, and of hardening to a rubber-like state by foaming and expanding due to heat during coating and baking. At room temperature after cooling, the mastic agent M retains viscoelastic properties similar to those of rubber and thereby reduces vibration of the outer panel OP. Moreover, the mastic agent M supports the outer panel OP by adhering to the reinforcing parts RP and the outer panel OP and can thereby enhance the rigidity of the outer panel OP.

This mastic agent M is also believed to contribute to thermal deformation of the exterior panel part, particularly the outer panel OP, by solidifying from a semi-solid state to a rubber-like state during baking and further undergoing expansion and contraction. However, details are unknown because the state during heating cannot be observed.

As existing insights into allowing observation of deformation of an exterior panel part due to heating, for example, the following techniques described in Patent Literatures 1 to 3 are known. Patent Literature 1 shows a method for observing thermal deformation of rollers that reach high temperatures in a chassis dynamometer in which an automobile travels on the rollers for simulation purposes. Using a plurality of radiation thermometers, this method calculates the degrees of thermal deformation of the rollers from their measurement values and feeds the result back to test conditions so as to reduce measurement errors due to thermal deformation, thereby allowing high-accuracy measurement.

Patent Literature 2 shows a system for managing the quality of a coated surface of an automobile. In this system, flaws in a coated surface of a vehicle body after completion of coating are captured with a camera and recorded as images, and these images are accumulated as a database. Thus, differences between a present coated surface and a coated surface of which the quality has decreased due to flaws having occurred in the past etc. can be compared.

Patent Literature 3 relates to a device that uses a millimeter-wave radar and an infrared camera in combination to detect obstacles on the front side of a vehicle. Heat detection in this device is required to determine whether an obstacle is a living object.

CITATION LIST

Patent Literature

Patent Literature 1: Japanese Patent No. 5358331
Patent Literature 2: JP-A-2009-066514
Patent Literature 3: Japanese Patent No. 4427771

SUMMARY OF INVENTION

Technical Problem

However, in all these techniques, the instrument used for measurement or the image capturing device is in a "room temperature" environment, so that the observation equipment can be easily operated even when an object to be measured has a high temperature. In a coating and baking process of an automobile or a common heating furnace, by contrast, a thick material having heat insulating properties is used for a furnace wall to retain heat, which makes the inside of the furnace dark and also difficult to observe from outside the furnace.

Thus, while defects of automotive exterior panel parts due to thermal deformation, such as buckling and distortion, are believed to occur during baking that involves heating and cooling among coating processes, the coating and baking process has a high temperature (about 200° C.) and the process of deformation of an outer panel and the states of property changes and deformation of a mastic agent that occur in the baking process cannot be observed from outside. For this reason, the cause of occurrence of thermal deformation of outer panels has not yet been clarified.

Further, structures such as automotive body parts are required to deliver expected performance even when exposed to low temperatures during actual use, and therefore need to pass a predetermined low-temperature test. Also in this low-temperature test, the state of a structure during the test has been hitherto unobservable, so that even when it turns out after the test that a defect has occurred during the test, it is difficult to clarify the cause of the defect.

Therefore, the present invention aims to provide a structure observation device and observation method that advantageously solve the problems with the conventional techniques as described above.

Solution to Problem

A structure observation device of the present invention that achieves the above object is characterized in that the device includes:
- a camera case of a rectangular three-dimensional shape, having a glass window of heat-resistant and/or cold-resistant glass on at least one side of the three-dimensional shape;
- heat insulating walls covering the camera case except for the glass window;
- a fluid supply port and a fluid discharge port through which a cooling or warming fluid is circulated into, of the inside of the camera case and the inside of the walls, at least the inside of the camera case; and
- a camera that is disposed inside the camera case and captures a still image or a moving image of a structure outside the camera case through the glass window and externally outputs or internally stores data of the captured image.

In the observation device of the present invention, the camera case may have a double structure composed of an inner box and an outer box, and the inner box and the outer box may each have the heat insulating walls.

The observation device of the present invention may include a lighting apparatus disposed around a lens of the camera, and a tubular reflection prevention member disposed between the lens and the lighting apparatus with respect to a direction orthogonal to an optical axis of the lens, at least on the inner side of the glass window.

Further, in the observation device of the present invention, the glass window may have a double structure composed of an inner window and an outer window. The tubular reflection prevention member disposed on the inner side of the inner window may have a constant diameter along a longitudinal direction, and the tubular reflection prevention member disposed between the outer window and the inner window may have a conical surface shape with the diameter increasing toward the outer window.

Moreover, the observation device of the present invention may include a support frame that supports the camera case in such a manner that the orientation and the support height are changeable. The support frame may support the structure in such a manner that the structure can be captured with the camera. The support frame may have an engaging part with which a transport device is engageable. In the observation device of the present invention, the structure may be an exterior panel part of an automotive body.

A structure observation method of the present invention that achieves the above object is characterized in that the method captures an image of a structure before and after heating or cooling and during the heating or cooling with a camera using the above-described observation device of the present invention, and observes changes in the structure before and after the heating or cooling and during the heating or cooling by means of the captured image.

Advantageous Effects of Invention

Simultaneously capturing the images of the states of deformation of an outer panel and deformation of a mastic agent in a coating and baking process of an automotive exterior panel part requires a camera having high performance specifications (in terms of the resolution, viewing angle, brightness, etc.). At the same time, however, heat resistance to about 200° C. is also required. While cameras having heat resisting performance are commercially available, they have drawbacks in terms of the resolution and brightness. Not only is it necessary to observe the state of deformation of the mastic agent applied between the outer panel and the reinforcing parts, but deformation of the outer panel and the reinforcing parts due to thermal expansion and contraction and changes in the gap therebetween also need to be captured. For such observation, cameras having ordinary heat resisting performance are inadequate.

Therefore, with a focus on being able to repeatedly use a camera having high performance specifications, such as a single-lens reflex camera, the observation device and the observation method of the present invention have adopted the above-described configurations such that, even when the observation device equipped with a camera having high performance specifications is disposed inside a coating and baking furnace having a high temperature of about 200° C., inside a freezing tester having a temperature of about 50° C. below zero, or the like, the camera can be kept in an atmosphere below its upper service temperature limit (e.g., 40° C.) or equal to or higher than its lower service temperature limit (e.g., 20° C. below zero).

In case that the luminous intensity inside the furnace is low, a lighting apparatus is incorporated around the lens of the camera such that the visual field can be adjusted to capture the image of a desired portion of an exterior panel part. It was found that reflection of lighting onto the glass window could be prevented by disposing a tubular reflection prevention member between the lighting apparatus and the lens of the camera with respect to a direction orthogonal to an optical axis of the lens of the camera. Thus, clear observation is possible even in an environment where a lighting apparatus is present.

The glass window has a relatively small area for heat to pass through and therefore may have a single structure. However, to enhance the heat insulating properties, it is preferable that the glass window have a double structure composed of an inner window and an outer window. In this case, it is preferable that a tubular reflection prevention member having a constant diameter in a longitudinal direction be disposed on the inner side of the inner window, and that another tubular reflection prevention member having a conical surface shape with the diameter increasing toward the outer window be disposed between the outer window and the inner window.

Further, the observation device and the observation method of the present invention can be used also when heating an exterior panel part and cooling it to room temperature as a single part for test purposes by an offline heating furnace, and therefore are also applicable when performing a heating and cooling test of an exterior panel part, such as a door, hood, or roof, as a single part without using a vehicle body itself or an actual production line.

Thus, the structure observation device and observation method of the present invention have made it possible to closely observe, by means of images of a camera having high performance specifications, the hitherto unobservable states of changes such as thermal deformation of a structure due to heating to a high temperature exceeding an upper service temperature limit (e.g., 40° C.) of the camera having high performance specifications and cooling from that high temperature to room temperature, or cold deformation of an exterior panel part or other structure due to cooling to a low temperature equal to or below a lower service temperature limit (e.g., 20° C. below zero) of the camera having high performance specifications and warming from that low temperature to room temperature, for example, thermal deformation of an outer panel, reinforcing parts, and a mastic agent while the automotive exterior panel part is heated and cooled under high-temperature conditions during coating and baking.

Consequently, the structure observation device and observation method of the present invention have made it possible to determine the cause of occurrence of defects, such as thermal deformation, due to thickness reduction of an outer panel of an exterior panel part in reducing the weight of an automotive body and take specific measures to thereby contribute to achieving thickness reduction of the outer panel.

BRIEF DESCRIPTION OF DRAWINGS

FIGS. 3(a), 3(b), and 3(c) are pictures showing images of an exterior panel part, as seen from the side of an inner panel, and graphs of changes in an atmospheric temperature, before heating inside a heating furnace, during heating, and during the subsequent cooling, respectively, that were acquired by a method for observing thermal deformation of an exterior panel part in a coating and baking process as one embodiment of a structure observation method of the present invention using the device of the embodiment for observing thermal deformation of an exterior panel part in a coating and baking process.

FIGS. 4(a) and 4(b) are pictures showing, in close-up, the states of deformation of the mastic agent shown in FIGS. 3(b) and 3(c).

DESCRIPTION OF EMBODIMENTS

Figure 1:
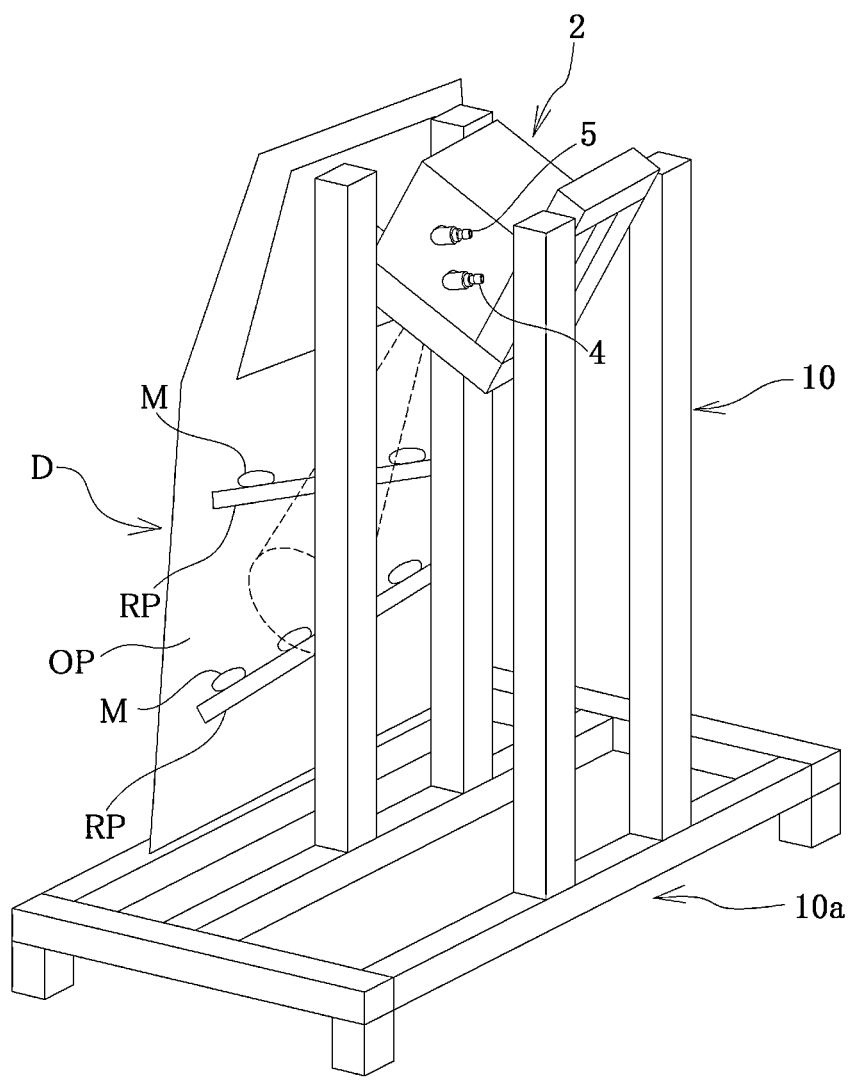
FIG. 1 is a perspective view showing an entire device for observing thermal deformation of an exterior panel part in a coating and baking process as one embodiment of a structure observation device of the present invention.
Figure 2:
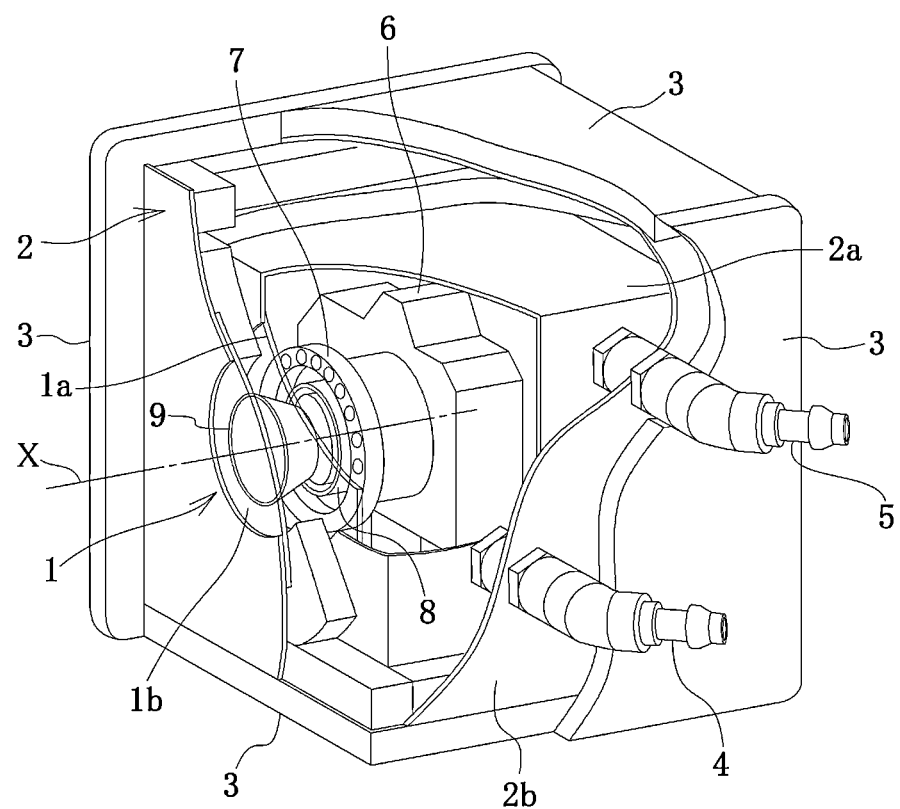
FIG. 2 is a partially cutaway perspective view showing a camera case covered by heat insulating walls in the device of the embodiment for observing thermal deformation of an exterior panel part in a coating and baking process.
Figure 5:
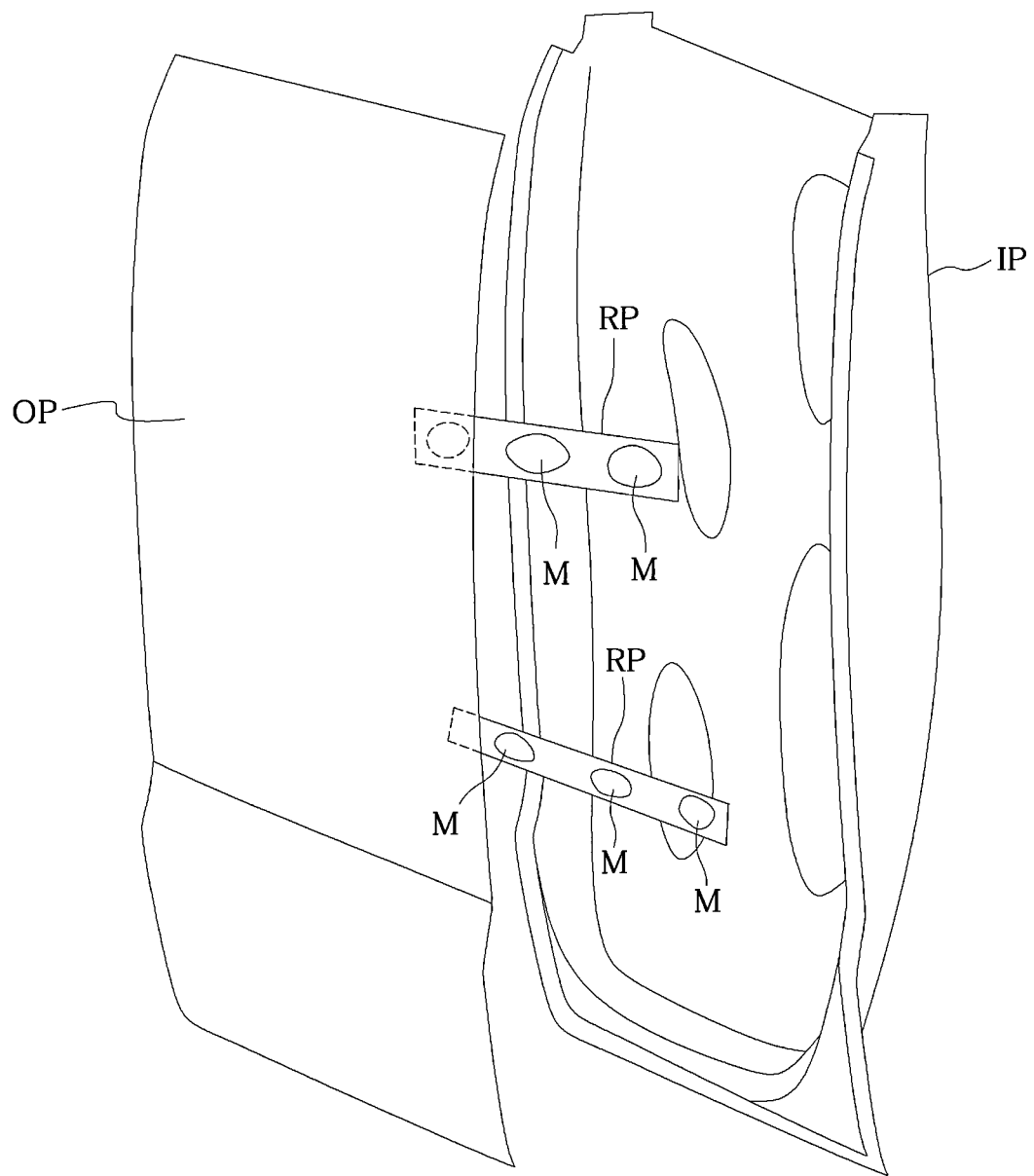
FIG. 5 is an exploded perspective view schematically showing a typical structure of a door that is an automotive exterior panel part as one example of structures.

Embodiments of the present invention will be described in detail below based on the drawings. Here, FIG. 1 is a perspective view showing an entire device for observing thermal deformation of an exterior panel part in a coating and baking process as one embodiment of a structure observation device of the present invention. FIG. 2 is a partially cutaway perspective view showing a camera case covered by heat insulating walls in the device of the embodiment for observing thermal deformation of an exterior panel part in a coating and baking process.

The device of this embodiment for observing thermal deformation of an exterior panel part in a coating and baking process includes: a camera case 2 of a rectangular three-dimensional shape, having a glass window 1 of heat-resistant glass on at least one side of the three-dimensional shape; a heat insulating wall 3 that cover the entire camera case 2 except for the glass window 1; a fluid supply port 4 and a fluid discharge port 5 through which a cooling fluid is circulated into, of the inside of the camera case 2 and the inside of the walls 3, at least the inside of the camera case 2; and a camera 6 having high performance specifications (in terms of the resolution, viewing angle, brightness, etc.) that is disposed inside the camera case 2 and captures still images or moving images of thermal deformation of a door D as a structure outside the camera case 2 through the glass window 1, and externally outputs or internally stores data of the captured images. As such a camera 6 having high performance specifications, for example, a mirrorless one-lens digital camera or a one-lens reflex digital camera can be used.

The glass window 1 has a double structure composed of an inner window 1a and an outer window 1b each made of heat-resistant glass. The camera case 2 also has a double structure composed of an inner box 2a in which the camera 6 is placed and an outer box 2b surrounding the inner box 2a. The inner box 2a is formed by, for example, a stainless-steel container and provided with the inner window 1a for observation on one side of the container, and the camera 6 is installed inside the inner box 2a with the lens facing the center of the inner window 1a. The outer box 2b is also formed by, for example, a stainless-steel container and provided with the outer window 1b aligned with the inner window 1a on one side of the container such that the outside of the camera case 2 can be captured by the lens of the camera 6 through the inner window 1a and the outer window 1b.

The camera case 2 further has two nozzles for passing the cooling fluid into the inner box 2a that are each mounted through the inner box 2a and the outer box 2b, with one nozzle serving as the fluid supply port 4 and the other nozzle serving as the fluid discharge port 5. Thus, by discharging the fluid having been raised in temperature inside the inner box 2a to the outside of the camera case 2 and introducing a new fluid into the inner box 2a from the outside of the camera case 2, the atmosphere inside the inner box 2a can be always kept at a low temperature (room temperature) below an upper service temperature limit (e.g., 40° C.) of the camera 6 having high performance specifications.

While the cooling fluid may be either gas or liquid, it is preferable that gas be used when the camera 6 has low or no waterproof performance. As the cooling fluid, for example, a fluid that is supplied from a fluid supply line inside a factory and always has a low temperature equal to or lower than a certain temperature may be used. Alternatively, a device for cooling the discharged fluid may be installed outside a heating furnace for thermal deformation testing, and the fluid may be used by being circulated between this cooling device and the inside of the inner box 2a.

The periphery of the outer box 2b is covered by the heat insulating walls 3 except for the glass window 1, and as the heat insulating material to form these walls 3, for example, ordinary glass wool can be used. The gap between the outer box 2b and the inner box 2a is also packed with a heat insulating material, which has a dampening effect on heat conduction from the outside to the inside of the inner box 2a. While in this embodiment air having low heat conductivity is used as the heat insulating material packed into the gap between the outer box 2b and the inner box 2a, a liquid having low heat conductivity, such as water or oil, may instead be used. As with the walls 3, ordinary glass wool or the like can instead be packed, and creating a vacuum, albeit difficult to handle, is also very effective.

The observation device in this embodiment further has a lighting apparatus 7 mounted on the camera 6. The lighting apparatus 7 can more effectively help prevent casting of a shadow by lighting, when it is of LED type that can be mounted in a ring form surrounding the lens of the camera 6.

Since the glass window 1 has a double structure in the observation device of this embodiment, it is difficult to restrict reflection of lighting. The present inventors found that reflection off the inner window 1a and the outer window 1b can be blocked by installing tubular covers 8, 9 as reflection prevention members that are located between the lens of the camera 6 and the lighting apparatus 7 with respect to a direction orthogonal to an optical axis X of the lens of the camera 6, respectively on the inner side of the inner window 1a of the glass window 1 and between the inner window 1a and the outer window 1b. The cover 8 has a constant diameter along a longitudinal direction, and the cover 9 has a conical surface shape with the diameter increasing toward the outer window 1b. These covers 8, 9 have made it possible to capture images free of reflection of lighting off the glass window 1. Commercially available light reflection prevention films have low heat resistance and have difficulty in maintaining clearness under high-temperature conditions, which makes them practically unusable for the glass window in this embodiment.

As shown in FIG. 1, the observation device of this embodiment further includes a support frame 10 that supports the camera case 2 through a turn bracket or a guide member, for example, in such a manner that the orientation is changeable in an up-down direction, for example, and that the support height is also changeable. The support frame 10 can support the door D as an exterior panel part by arms (not shown) provided so as to protrude from the support frame 10, in such a manner that the inner side of the door D can be captured with the camera 6. The support frame 10 has, at its lower end, an engaging part 10a that is a space to which a transfer device, such as forks of a forklift, can be engaged. The support frame 10 can be formed by, for example, combining a plurality of square rod-shaped extruded aluminum members having an engaging groove in each of surrounding surfaces.

Example

In the observation method of the above embodiment, the observation device of the above embodiment was set inside a heating furnace and the states of deformation due to heat of an outer panel OP, reinforcing parts RP, and a mastic agent M of the door D that is one type of automotive body exterior panel parts were observed. In FIG. 1, an inner panel IP of the door D is not shown.

Examples of observation are shown in FIG. 3. The temperature of the door D was raised to a maximum temperature of 180° C. and held for 20 minutes, and then the door D was cooled inside the furnace. Also at the maximum temperature of 180° C., the outer panel OP, the mastic agent M, and the reinforcing parts RP could be clearly observed, and even when the mastic agent M was partially enlarged as shown in FIG. 4, the mastic agent M could be closely observed up to its surface. This result is credited to the one-lens camera 6 having a high resolution, a bright lens, and a large sensor.

While the present invention has been described above based on the examples shown in the drawings, the present invention is not limited to the above embodiments. For example, in the above embodiments, the glass window 1 and the camera case 2 each have a double structure. Alternatively, each of the glass window 1 and the camera case 2 may have a single structure, and the cooling device that cools the fluid for the inside of the camera case 2 outside the camera case 2 may be configured to have a higher capacity. A structure to be observed may be supported so as to be captured with the camera 6 by a separate support jig that can be positioned relative to the support frame 10.

Further, in the above embodiments, thermal deformation of the door D that is one type of exterior panel parts of an automotive body is observed, but the present invention may also be used to observe other types of exterior panel parts, such as a roof, hood (bonnet), fender, or a back door (tailgate). In the above example, observation was conducted offline outside the coating and baking process, but observation of an exterior panel part during coating and baking may also be conducted by installing the device of the above embodiment in the coating and baking process.

Moreover, while the observation device and the observation method of the above embodiments are used to observe thermal deformation of a structure, the observation device and the observation method of the present invention may also be used to observe cold deformation of a structure. In this case, the glass window 1 may have a double structure composed of the inner window 1a and the outer window 1b each made of cold-resistant glass, or a single structure composed only of the outer window 1b made of cold-resistant glass. The fluid to be circulated into the camera case may be a gas or a liquid that warms the atmospheric temperature inside the camera case to a temperature equal to or higher than the lower service temperature limit of the camera having high performance specifications.

While the observation device and the observation method of the above embodiments are applied to observation of thermal deformation of an exterior panel part of an automotive body, the present invention is not limited thereto and can also be used to observe changes, such as thermal deformation or cold deformation, of structures composing products other than automobiles, for example, personal computers and home electric appliances.

INDUSTRIAL APPLICABILITY

As has been described, the structure observation device and observation method of the present invention have made it possible to closely observe, by means of images of the camera having high performance specifications, the hitherto unobservable states of changes such as thermal deformation of a structure due to heating to a high temperature exceeding the upper service temperature limit (e.g., 40° C.) of the camera having high performance specifications and cooling from that high temperature to room temperature, or cold deformation of an exterior panel part or other structure due to cooling to a low temperature equal to or below the lower service temperature limit (e.g., 20° C. below zero) of the camera having high performance specifications and warming from that low temperature to room temperature, for example, thermal deformation of an outer panel, reinforcing parts, and a mastic agent while the automotive exterior panel part is heated and cooled under high-temperature conditions during coating and baking.

Consequently, the structure observation device and observation method of the present invention have made it possible to determine the cause of occurrence of defects, such as thermal deformation, due to thickness reduction of an outer panel of an exterior panel part in reducing the weight of an automotive body and take specific measures to thereby contribute to achieving thickness reduction of the outer panel.

REFERENCE SIGNS LIST

1 Glass window
1a Inner window
1b Outer window
2 Camera case
2a Inner box
2b Outer box 3 Wall
4 Fluid supply port
5 Fluid discharge port
6 Camera
7 Lighting apparatus
8, 9 Cover
10 Support frame
10a Engaging part
D Door
IP Inner panel
OP Outer panel
RP Reinforcing part
M Mastic agent
X Optical axis

The invention claimed is:

1. A structure observation device wherein the device comprises:
   a camera case of a rectangular three-dimensional shape, having a glass window of heat-resistant and/or cold-resistant glass on at least one side of the three-dimensional shape;
   heat insulating walls covering the camera case except for the glass window;
   a fluid supply port and a fluid discharge port through which a cooling or warming fluid is circulated into, of an inside of the camera case and an inside of the walls, at least the inside of the camera case;
   a camera that is disposed inside the camera case and captures a still image or a moving image of a structure outside the camera case through the glass window and externally outputs or internally stores data of the captured image;
   a lighting apparatus disposed around a lens of the camera inside the camera case; and
   a tubular reflection prevention member disposed between the lens and the lighting apparatus with respect to a direction orthogonal to an optical axis of the lens, at least on an inner side of the glass window, wherein:
   the glass window has a double structure composed of an inner window and an outer window;
   the reflection prevention member disposed on an inner side of the inner window has a constant diameter along a longitudinal direction; and
   the reflection prevention member disposed between the outer window and the inner window has a conical surface shape with a diameter increasing toward the outer window.

2. The structure observation device according to claim 1, wherein:
   the camera case has a double structure composed of an inner box and an outer box; and
   the inner box and the outer box each have the heat insulating walls.

3. The structure observation device according to claim 1, wherein the device comprises a support frame that supports the camera case in such a manner that an orientation and a support height are changeable.

4. The structure observation device according to claim 3, wherein the support frame supports the structure in such a manner that the structure can be captured with the camera.

5. The structure observation device according to claim 3, wherein the support frame has an engaging part with which a transport device is engageable.

6. The structure observation device according to claim 1, wherein the structure is an exterior panel part of an automotive body.

7. A structure observation method wherein the method captures an image of a structure before and after heating or cooling and during the heating or cooling with a camera using the structure observation device according to claim 1, and observes changes in the structure before and after the heating or cooling and during the heating or cooling by means of the captured image.

* * * * *